United States Patent
Bar-Yaakov et al.

(10) Patent No.: US 8,247,076 B2
(45) Date of Patent: Aug. 21, 2012

(54) FLAME RETARDANT ADDITIVE OF FLUOROPOLYMERS IN FLAME RETARDANTS

(75) Inventors: Yoav Bar-Yaakov, Lehavim (IL); Pierre Georlette, Omer (IL); Daniel Plewinski, Meitar (IL); Ita Finberg, Beer Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 471 days.

(21) Appl. No.: 10/580,661

(22) PCT Filed: Dec. 2, 2004

(86) PCT No.: PCT/IL2004/001102
§ 371 (c)(1),
(2), (4) Date: Feb. 15, 2007

(87) PCT Pub. No.: WO2005/054355
PCT Pub. Date: Jun. 16, 2005

(65) Prior Publication Data
US 2007/0225415 A1 Sep. 27, 2007

(30) Foreign Application Priority Data
Dec. 4, 2003 (IL) .......................................... 159196

(51) Int. Cl.
*B32B 5/16* (2006.01)
*C08K 9/00* (2006.01)
*B29B 9/00* (2006.01)

(52) U.S. Cl. ............ 428/407; 264/7; 428/402; 427/222; 523/207; 523/210; 524/109; 524/114; 524/520; 524/544; 524/546

(58) Field of Classification Search ............... 525/326.2, 525/190, 199, 208; 524/115, 127, 128, 281, 524/109, 114, 544, 546; 106/18.24, 18.25, 106/18.35; 252/601, 604, 609; 428/357; 427/222; 523/207, 210; 264/7

See application file for complete search history.

(56) References Cited

U.S. PATENT DOCUMENTS

| | | | |
|---|---|---|---|
| 4,579,906 A | 4/1986 | Zabrocki et al. | |
| 4,649,168 A | 3/1987 | Kress et al. | |
| 4,753,994 A | 6/1988 | Carter, Jr. et al. | |
| 4,849,134 A * | 7/1989 | Georlette et al. | 252/601 |
| 5,225,313 A * | 7/1993 | Aono et al. | 430/213 |
| 5,290,835 A * | 3/1994 | Hatayama et al. | 524/109 |
| 5,300,539 A * | 4/1994 | Chatterjee | 523/204 |
| 5,521,230 A | 5/1996 | Bhatia et al. | |
| 5,688,449 A * | 11/1997 | Fox | 264/54 |
| 6,040,370 A | 3/2000 | Wozny et al. | |
| 6,043,310 A * | 3/2000 | Liu et al. | 524/502 |
| 6,093,760 A * | 7/2000 | Nishihara et al. | 524/145 |
| 6,469,072 B1 | 10/2002 | Bhatia et al. | |
| 6,503,988 B1 * | 1/2003 | Kitahara et al. | 525/326.2 |
| 2002/0134771 A1 * | 9/2002 | Wenger et al. | 219/121.69 |

FOREIGN PATENT DOCUMENTS

| | | |
|---|---|---|
| EP | 0550204 | 8/1993 |
| EP | 0861856 | 3/2001 |
| JP | 09-324071 | 12/1997 |
| JP | 09324093 A * | 12/1997 |
| JP | 2001-2947 | 1/2001 |

OTHER PUBLICATIONS

Yamamoto et al., machine translation of JP09324093A.*
YDB-408: Brominated Epoxy Resin, Kukdo, Dec. 2004, http://www.kukdo.com/file/goods/YDB-410P_TDS.pdf.*
Yamamoto et al., machine translation of JP 09324093 A, Jun. 2008.*
International Search Report of corresponding PCT application—4 pages, May 6, 2005.
International Preliminary Report on Patentability for corresponding PCT application—5 pages, Jun. 7, 2006.

* cited by examiner

*Primary Examiner* — Mark Eashoo
*Assistant Examiner* — Nicole M Buie-Hatcher
(74) *Attorney, Agent, or Firm* — Roach Brown McCarthy & Gruber, P.C.; Kevin D. McCarthy

(57) ABSTRACT

Composition comprising fluoropolymers, such as polytetrafluoroethylene (PTFE), poly(hexafluoroethylene), poly(tetrafluoroethylene-hexafluoroethylene), and poly(tetrafluoroethylene-ethylene-propylene), which are dispersed in flame retardants, such as organic, bromine compounds and/or organic phosphorus compounds, and that consist of particles that comprise one or more fluoropolymers and flame retardants. The fluoropolymers may be enveloped by the flame retardant.

17 Claims, No Drawings

FLAME RETARDANT ADDITIVE OF FLUOROPOLYMERS IN FLAME RETARDANTS

FIELD OF THE INVENTION

This invention relates to a process for dispersing fine solid additives in mixtures with synthetic, thermoplastic, polymer and to products prepared therewith. More specifically, the present invention relates to a process for dispersing a poly (tetrafluorethylene) solid additive into a flame retarded thermoplastic resin and to products prepared thereby.

BACKGROUND OF THE INVENTION

Thermoplastic resins are used in many applications such as household, building industry, automotives and electricity, which require a high degree of flame retardation. According to one of the most common standards used in the industry, namely Underwriters Laboratory (UL) 94 V0, the plastics are required not to develop, during combustion, dripping, which may contribute to the spreading of fire to other materials.

The use of fluoropolymers, particularly the addition of poly (tetrafluoroethylene) (PTFE) fine powder to a flame retardant system is an effective way to prevent the flame dripping of many thermoplastic materials.

It is known in the art to prepare homogeneous mixtures of synthetic polymeric resins with a wide variety of solid phase additives. However, the addition of PTFE fine powder to thermoplastic resins meets with difficulties since the PTFE powder has poor flowability and tends to fibrillate when subjected to even low shear forces. The fibrillated powder blocks the flow of the powder in the mixer or the extruder's feeder and results in low quality compounds with poor dispersion of the PTFE, poor appearance and reduced contribution to flame retardancy. These drawbacks are known and the art has attempted to overcome them.

Representative of prior art processes is that described in U.S. Pat. No. 4,649,168. Accordingly to this patent particles of PTFE are dispersed in aromatic polycarbonate resin-based molding compositions. The dispersion is carried out, in brief, by admixture of aqueous emulsions of the two components followed by coagulation of the emulsion mixture. Coagulation may be carried out by spray-drying, freeze-drying or the addition of inorganic or organic salts, acids, bases or organic solvents which are miscible with water. The process results in fine dispersions of the PTFE in the polycarbonate resin, but the degree of dispersion is dependent upon a number of variables, which require close control.

Other methods to improve the dispersion of PTFE in thermoplastic resins are known in the art.

U.S. Pat. No. 4,753,994 discloses a process for incorporating a fluoropolymer in polycarbonate compositions, comprising adding an aqueous dispersion of a fluoropolymer to a polycarbonate solution, agitating the mixture thus formed, adding a precipitation agent to cause co-precipitation of the polycarbonate and said fluoropolymer, filtering the co-precipitate, washing and drying the filtrate.

U.S. Pat. Nos. 5,521,230 and 6,469,072 disclose a method for dispersing solid forms of additives in polymers, which involves adding dispersions or solutions of additive(s) to a solution of polymer in a tubular mixer (preferably in the presence of a stationary mixer). The mixer leads to a steam precipitation step, wherein all fluid ingredients in the mixture are volatilized leaving the solid additive and resin in the desired ratio.

Molded parts prepared from the compositions of the U.S. Pat. No. 4,753,994 are characterized by an improved homogeneity and flame retardancy. The process described in U.S. Pat. Nos. 5,521,230 and 6,469,072 preserves the physical properties of thermoplastic polymer matrix to which the additives described therein have been added, thanks to the uniform dispersion of said additives in said polymer matrix. However, all the above processes involve the use of organic solvents that need to be removed from the final product by evaporation, and therefore are expensive and highly specialized.

U.S. Pat. No. 4,579,906 discloses a process for making ABS molding materials by mixing an aqueous dispersion of PTFE powder, stabilized with an ethoxylated nonyl phenol surfactant, with a latex of one or more graft polymers ("graft rubbers") or a latex of one or more matrix resins ("SAN") or a latex mixture of both, and coagulating the polymer mixture, or optionally mixing said mixture with further graft polymer and/or matrix resin and with inorganic synergists for improving flameproofing and organic halogen compounds.

U.S. Pat. No. 6,040,370 relates to the use of fluoropolymers as additives in thermoplastic resin compositions and, more particularly, a stabilized aqueous fluoropolymer dispersion which includes a fluoropolymer and a fatty acid salt, and to a method for making a thermoplastic resin composition comprising a fluoropolymer additive. The fluoropolymer additive is made by combining an aqueous fluoropolymer dispersion with a second polymer, particularly a styrene-acrylonitrile resin, and precipitating and drying the resulting combination.

EP 0550204 describes polyphenylene ether flame-retarded resins which have been rendered non-dripping through the inclusion of a drip-inhibiting amount of high molecular weight polyethylene resin. It discusses prior art that achieves non-dripping through the use of polytetrafluoroethylene, which however is said to be extremely costly and difficult to blend with polyphenylene ether resins.

EP 0861856 describes the preparation of PTFE powder that is more flowable. However, the preparation is made in a highly specialized equipment and the flow of the powder is not as good as desired.

However, prior art methods present several drawbacks. The use of ethoxylated nonyl phenol surfactants is under scrutiny from the perspective of environmental safety, and alternative approaches to stabilizing aqueous fluoropolymer dispersions are highly desirable. Co-coagulated fluoropolymer-thermoplastic resin compositions tend to be very difficult to handle due to clumping and poor flowability and it is correspondingly difficult to incorporate such additives uniformly and reproducibly into a thermoplastic resin composition. Non-uniform distribution of fluoropolymer additive within a thermoplastic resin composition may result in, e.g., surface imperfections, such as e.g., streaking and splay, and in inconsistent combustion performance, such as, e.g., uneven shrink rates and dripping.

In industrial manufacturing, economy, productivity and working efficiency must be taken into consideration. Even though the prior art improves some aspects related to the dispersion of conventional polytetrafluoroethylene in mixtures with synthetic, thermoplastic, polymer, it does not overcome the aforementioned drawbacks, leading to less economical and productive processes than desired. Moreover, PTFE concentrates in powder form, produced according to the prior art, tend to segregate from dry blended mixtures of flame retardants and/or resins and/or plastic additives.

A fluoropolymer-thermoplastic resin additive, that is in the form of a free-flowing powder, would be highly desirable from both the perspective of material handling and improving the uniformity and reproducibility of the thermoplastic resin compositions made therefrom.

It is therefore an object of this invention to provide an economic and efficient process for introducing a fluoropolymer into a flame retarded thermoplastic resin and evenly disperse it throughout the polymer.

It is another object of this invention to provide a fluoropolymer concentrate that is easily compounded with a base thermoplastic resin.

It is a further object of this invention to provide a thermoplastic resin composition that is flame retarded and includes anti-dripping agent-that is free from the defects of known such compositions, in particular is free from surface imperfections and inconsistent combustion performance.

It is a still further object of this invention to provide a process for improving the PTFE fine powders flowability when they are dispersed as additive into thermoplastic resins.

It is a still further object of the present invention to provide an antidripping agent having excellent handling characteristics and dispersibility while maintaining antidripping property, as well as flame retardant resin compositions containing the antidrippping agent.

Other objects and advantages of the invention will become apparent as the description proceeds.

SUMMARY OF THE INVENTION

The present invention provides a process for preparing a flame retarded thermoplastic resin which contains a fluoropolymer anti-dripping agent which is evenly dispersed throughout the thermoplastic resin. Said process comprises the preparation of a fluoropolymer concentrate by dispersing a fluoropolymer powder in a low viscosity melt of flame retardant(s) or flame retardant precursor(s). The fluoropolymer concentrate is then added to the resin during the compounding stage. If desired, other additives can be added to the thermoplastic resin (hereinafter also called "base resin" or "resin matrix") in the compounding or molding stages. Since said fluoropolymer is preferably PTFE, this latter will be referred to throughout the present specification, but this should not be construed as a limitation. Said fluoropolymer concentrate, as a composition, is one of the aspects of the invention.

The fluoropolymer concentrate could be added to the resin matrix in the compounding stage while still in the molten condition. The concentrate is, as such, an aspect of the present invention. In the solid condition it is formed by granules of fluoropolymer, preferably PTFE, at least a majority of which are covered with a coating of the flame retardant used. In one type of embodiment, the solidified concentrate is obtained as a bulk block, which is reduced into coarse powder by the use of a suitable apparatus, e.g. a granulator or grinder provided with rotating and stationary knives that cut the bulk block into a coarse powder.

The flame retardant(s) or flame retardant precursor(s) used should be meltable and have a melt viscosity such that it may be easily mixed in a conventional mixer, and should have such melt viscosity at a temperature at which it is stable, at least for the time required to mix it with the PTFE. Desirably, said melt viscosity should be below 10000 cp, preferably below 2000 cp. Preferably, the mixing temperatures are from 50° C. to 300° C. Preferably, the flame retardants have a melting point below 300° C., and more preferably are obtained from precursors having a melting point below 300° C.

Preferred examples of flame retardants are brominated epoxy resins, high molecular weight brominated epoxy resins, modified brominated epoxy resins (e.g., tribromophenol modified medium molecular weight brominated epoxy resin), low molecular weight brominated epoxy resins, tetrabromobisphenol bis(2,3-dibromopropyl ether) (e.g. FR-720 produced by DSBG), partly end-capped brominated epoxy resins with fatty acid, tris(tribromophenyl) triazine (e.g. FR-245 produced by DSBG), bromophenyltrimethylindane (e.g. FR-1808 produced by DSBG), brominated polyacrylate, brominated polycarbonate, phenoxy-terminated carbonate oligomer of tetrabromobisphenol A and related, polypentabromobenzyl acrylate (e.g. FR-1025 produced by DSBG), brominated acrylate monomer (e.g. FR-1025M produced by DSBG), brominated styrene and their homo- and co-polymers, tetrabromobisphenol A, brominated diphenylethane, decabromodiphenyl oxide, alkyl-phosphinic acid salts, tris (tribromoneopentyl)phosphate (e.g. FR-370 produced by DSBG), phosphate esters, phosphonate esters, and their mixtures.

By "flame retardant precursors" is meant herein compounds that react, generally in the presence of a catalyst, to form the desired flame retardant. When the flame retardant is a high molecular weight brominated epoxy resin, the preferred precursors are low molecular weight (MW) brominated epoxy, brominated epoxy oligomer and tetrabromobisphenol-A. When the flame retardants are polymeric or copolymeric, their precursors are their respective monomers or monomer mixtures. In general, what precursors may or should be used to make a given flame retardant, is known to skilled persons.

Various types of PTFE are available on the market and some of them will be cited hereinafter. The PTFE content in the concentrate is from 0.1 to 60 wt %. The amount of concentrate that is compounded with the matrix resin is from 0.01 to 35 wt %. The PTFE is used, in the process of the invention, in particulate or powder form, wherein the particles or granules have linear dimensions from 5 to 1000 μm.

The matrix resin may be any known thermoplastic resin, and typical examples are polystyrene, impact polystyrene, styrene copolymers, acrylonitrile butadiene styrene terpolymers (ABS), alloys of ABS such as polycarbonate/ABS, alloys of polystyrene such as polyphenylene oxide/polystyrene, polycarbonates, polycarbonate alloys with PBT or polyamide, polyesters such as polybutylene terephthalate (PBT) and polyethylene terephthalate (PET), polyamide resins such as polyamide 6 and 66, styrene acrylonitrile copolymer (SAN), polyphenylene ether (PPE), polyester carbonate and blends of the aforesaid polymers.

Suitable fluoropolymers include homopolymers and copolymers that comprise repeating units derived from one or more fluorinated alpha olefin monomers. The term "fluorinated alpha olefin monomer" means an alpha olefin monomer that includes at least one fluorine atom substituent. Suitable fluoropolymers include poly(tetrafluoroethylene) homopolymer (PTFE), poly(hexafluoroethylene), poly(tetrafluoroethylene-hexafluoroethylene), and poly(tetrafluoroethylene-ethylene-propylene).

The composition of the invention, viz. the fluoropolymer concentrate as hereinbefore defined, may further comprise additional additives such as ultraviolet and light stabilizers, UV screeners, UV absorbers, release agents, lubricants, colorants, plasticizers, fillers, blowing agents, heat stabilizers, antioxidants, reinforcement additives (e.g. fillers), impact modifiers, and processing aids.

The invention further comprises a process for making a composition, viz. a fluoropolymer concentrate, as described hereinbefore, which process comprises melting a flame retardant, mixing the fluoropolymer with said molten flame retardant, allowing the mixture to solidify and particulating the solidified mixture. Preferably said process comprises providing flame retardant precursors in molten condition, mixing said precursors with a fluoropolymer and optionally with a catalyst, reacting said precursors to form a molten flame retardant mixed with said fluoropolymer, allowing the mixture to solidify and particulating the solidified mixture.

As hereinbefore set forth, the fluoropolymer concentrate can be added to the resin matrix in the compounding stage while still in the molten condition. The compounding may be carried out in an apparatus selected from the group consisting of extruders, batch mixers and internal mixers.

Plastic articles can be made by extruding or molding flame retarded thermoplastic resin of the invention, and such articles are comprised in the invention.

The invention further comprises a master batch containing fluoropolymers dispersed in flame retardants in a plastic carrier.

DETAILED DESCRIPTION OF PREFERRED EMBODIMENTS

All the above and other characteristics and advantages of the invention will be better understood through the following illustrative and non-limitative examples.

Preparation of the PTFE Concentrate

For the preparation of the concentrate, the flame retardant, or flame retardant precursors or their mixtures, are melted and the PTFE is mixed with it under stirring and with whatever heating is needed to maintain the mixture in the molten state. Thereafter it is allowed to solidify. The PTFE can be added to a mixture containing Low Molecular Weight (MW) epoxy resin, TBBA and a catalyst. This mixture reacts exothermally causing simultaneous rise of temperature, MW and viscosity. The PTFE is trapped in the viscous liquid that solidifies on cooling, forming a bulk block and finally said block is granulated by a suitable granulator. Alternatively, the flame retardant precursor compounds and a desired catalyst, if any, are mixed gradually, while being heated to form a molten phase, and the PTFE is mixed with them together with at least the last precursor, and the precursors are reacted together to form the flame retardant in the presence of the PTFE.

The materials used in the examples are detailed in Table 1.

TABLE 1

Materials used

| Trade Name (Producer) | General information | Function |
|---|---|---|
| YDB-400 ex Tohto | Low MW brominated epoxy oligomer | Reactant |
| TBBA ex DSBG | Tetrabromobisphenol-A | Reactant |
| TBP ex DSBG | TriBromo Phenol | Reactant |
| TBPBr (10%) ex DSBG | Tetrabutylphosphonium bromide (10% in F-2001) | Catalyst |
| FR-720 ex DSBG | Tetrabromobisphenol bis (2,3-dibromopropyl ether) | Flame Retardant |
| FR-245 ex DSBG | Tris(tribromophenyl)triazine | Flame Retardant |
| F-3020 ex DSBG | Endcapped brominated epoxy oligomer (MW 2,000) | Flame Retardant |
| F-2400 ex DSBG | Brominated epoxy oligomer MW: 50000 | Flame Retardant |
| FR-1025 Ex. DSBG | Poly(pentabromobenzyl acrylate) | Flame Retardant |
| AO 112 ex Kafrit | Master batch containing 80% antimony trioxide and 20% styrenic carrier | FR-synergist |
| AO M-0112 ex Kafrit | Master batch containing 80% antimony trioxide and 20% acrylate carrier | FR-synergist |
| PTFE 6-CN ex Du Pont | PTFE (500-600 micron) | Anti-dripping agent |
| Hostaflon 9202 ex Dyneon | PTFE (5 micron) | Anti-dripping agent |
| Hostaflon 2071 ex Dyneon | PTFE (500 micron) | Anti-dripping agent |
| Blendex 449 ex General Electric Specialty Chemicals | 50% PTFE encapsulated in Styrene Acrylonitrile Copolymer | Anti-dripping agent |
| 10% PTFE 6-CN masterbatch concentrate in F-2400 ex Kafrit | Experimental PTFE 6-CN master batch (10% PTFE, F-2400 carrier) | Anti-dripping agent |
| ABS Magnum 3404 ex Dow | Acrylonitrile butadiene styrene terpolymer, general purpose grade | Plastic Matrix |
| Lexan 141 ex GE Plastics | Polycarbonate Resin Multi purpose grade (MFI = 14.4 g/10 min.) | Plastic Matrix |
| PBT Celanex 2002-2 Ex Ticona | Poly(butylene terephthalate) non-reinforced PBT | Plastic Matrix |
| Irganox B-225 ex Ciba | Blend of Irganox 1010 and Irgafos 168 | Heat stabilizer/antioxidant |
| Irganox B-900 ex Ciba | Blend of Irganox-1010 and Irgafos 168 | Heat stabilizer/antioxidant |

EXAMPLE 1

4% PTFE (polytetrafluoroethylene) concentrates in high molecular weight brominated epoxy resin flame retardant, were prepared using PTFE 6-CN ex Du-Pont and PTFE Hostaflon 9202 ex Dyneon. For preparing the high molecular weight brominated epoxy resin flame retardant PTFE concentrate, low molecular weight (MW) brominated epoxy oligomer YDB-400 was placed in a beaker and the beaker was placed in a circulated air oven at 170° C. for 3 hours. A high-speed mixer was placed in the beaker containing the melted brominated epoxy at 150° C. and was started at 3600 rpm. TBBA and TBPBr (catalyst) were added while mixing, and the melt temperature was reduced to 125° C. The temperature increased exothermally and when it reached 135° C., PTFE was added, the melt temperature was reduced to 132° C. and the mixing speed was increased to 5500 rpm. The temperature increased and when it reached 150° C. the liquid mixture was transferred into an aluminum mold and placed in a circulated air oven at 170° C. for 4.5 hours. The resulting product block was cooled and granulated into a coarse powder using a granulator ex Rapid. The granulator is made from rotating and stationary knives that cut the block into a coarse powder that is passed through a 4 mm screen.

The samples composition and analytical results are shown in Table 2.

TABLE 2

Composition and analysis of PTFE concentrates

| | Sample number | |
|---|---|---|
| | 1 | 2 |
| YDB 400, grams | 609.2 | 609.2 |
| TBBA, grams | 387.6 | 387.6 |
| PTFE 6-CN, grams | 42 | |
| Hostaflon 9202, grams | | 42 |
| TBPBr (10%), grams | 2 | 2 |
| Chemical Properties | | |
| MW (weight average molecular weight) by GPC (Gel permeation chromatograph) | 33800 | 33400 |
| GPC MN (Number average molecular weight) | 8500 | 8300 |
| Color Apha according to ASTM D-2108/97 (Not Filtered) | 304 | Turbid Solution |
| Color Gardner according to ASTM D-1544 (Not Filtered) | 5.4 | Turbid Solution |
| AN | 0.37 | 0.53 |

AN means acid number expressed in mg KOH/gr

EXAMPLE 2

6% and 12% PTFE concentrates in tribromophenol modified medium molecular weight brominated epoxy resin flame retardant were prepared using three different kinds of PTFE: PTFE 6-CN ex Du-Pont, PTFE Hostaflon 2071 ex Dyneon and PTFE Hostaflon 9202 ex Dyneon.

The amounts of chemicals used in this example are given below in Table 3. For preparing the PTFE concentrate in tribromophenol modified medium molecular weight brominated epoxy resin, YDB-400 was placed in a beaker and the beaker was placed in a circulated air oven at 170° C. After 3 hours, when the temperature reached 150° C., a high-speed mixer was placed in the beaker and started at 3600 rpm. TBBA and TBPBr 10% (catalyst) were added while mixing, and then the melt temperature was reduced to 110° C. The temperature increased exothermally and when it reached 145° C., and while maintaining the mixing, TBP was added. The temperature increased and when it reached 150° C., PTFE was added, then the melt temperature was reduced to 148° C. and the mixing speed was increased to 5500 rpm. The temperature increased exothermally and when it reached 155° C., the reaction mixture was transferred into an aluminum mold and placed in a circulated air oven at 165° C. for 4 hours. The resulting product block was cooled and granulated to a coarse powder using a granulator ex Rapid. In Table 3 the samples composition and analytical results achieved in this example are shown.

TABLE 3

Composition and analysis of PTFE concentrates

| | Sample number | | | | |
|---|---|---|---|---|---|
| | 3 | 4 | 5 | 6 | 7 |
| YDB 400, grams | 1192.4 | 1192.4 | 1192.4 | 298.1 | 596.6 |
| TBBA, grams | 706 | 706 | 706 | 176.5 | 353 |
| TBP, grams | 101.2 | 101.2 | 101.2 | 25.3 | 50.6 |
| PTFE 6-CN, grams | — | — | 133.2 | 66.6 | — |
| Hostaflon 9202, grams | 133.2 | 266.4 | — | — | — |
| Hostaflon 2071, grams | — | — | — | — | 133.2 |
| TBPBr (10%), grams | 4 | 4 | 4 | 1 | 2 |
| Resulting wt % PTFE (calculated) | 6 | 12 | 6 | 12 | 12 |
| Chemical Analysis | | | | | |
| GPC MW | 19229 | 18400 | 19613 | 16325 | 16405 |
| GPC MN | 4843 | 8066 | 7292 | 6468 | 6427 |
| Color Apha (Filtered) | 60 | 78 | 98 | 87 | 63 |
| AN | 0.2 | 0.17 | 0.15 | 0.65 | 0.5 |

EXAMPLE 3

A PTFE concentrate in FR-720 flame retardant was prepared, weighing 340 g of FR-720 in a 1000-ml glass beaker, which subsequently was placed in a circulated air oven at 170° C. for 3 hours. A high-speed mixer was placed in the beaker containing the melted FR-720, and mixing at 3600 rpm was started. During the mixing, 30 g of PTFE (Hostaflon 2071) were added, the melt temperature was reduced to 128° C., and the rotation speed was increased to 8000 rpm. After 2 minutes of rotation the liquid mixture was transferred into an aluminum mold. A solid homogeneous mixture was obtained. The solid mixture was ground manually, and a white powder was obtained.

EXAMPLE 4

With the objective to evaluate PTFE concentrate in FR-1025 in flame retarded (FR) PBT formulations, an experimental work was performed. In this work, FR-1025M was polymerized in the presence of 10% PTFE 6-CN. The materials used in this experiment are detailed in Table 1. The following is a description of the procedure performed.

Extrusion polymerization was performed in Berstorff ZE-25 co-rotating twin-screw extruder L\D=32 with open vent at zone 7. Feeding was performed by gravimetric feeding system K-SFS24 ex. K-Tron. FR-1025M and PTFE powder were mixed manually in a plastic bag and fed to the extruder via the main feeding port. The polymerization went smoothly.

The product obtained was a viscous melt. The concentrated melt was collected on a stainless steel tray, cooled and ground by food processor. Conditions of polymerization are shown in Table 4 and the properties of the concentrate obtained are shown in Table 5.

TABLE 4

Conditions of Polymerization (Berstorff ZE-25 extruder)

| Processing Conditions Parameters | Unit | Parameters |
|---|---|---|
| ZONE 1 | °C. | RT |
| ZONE 2 | °C. | 190 |
| ZONE 3 | °C. | 190 |
| ZONE 4 | °C. | 190 |
| ZONE 5 | °C. | 190 |
| ZONE 6 | °C. | 190 |
| ZONE 7 | °C. | 190 |
| ZONE 8 | °C. | 200 |
| Temperature of nozzle | °C. | 210 |
| Screw Speed | rpm | 350 |
| Feed Rate | Kg/h | 6 |
| Amperage | A | 4 |
| Die Pressure | bar | 1 |
| Melt Temperature | °C. | 185-205 |

TABLE 5

Properties of PTFE concentrate (Sample Number 8)

| Property | Test method | Value |
|---|---|---|
| Appearance | Visual | An off-white free flowing powder |
| Molecular-weight distribution | GPC | MN = 17800, MW = 128100 |
| Residual monomer | FTIR | Less than 1% |

EXAMPLE 5

A series of injection molded samples have been prepared in order to illustrate the invention. In this Example 5 are described the details about the preparation of these molded samples.

The preparation and properties of the PTFE concentrates according to the invention are given in the previous Examples 1 to 4.

All the components used for performing the compounding of all the blends were weighed on a Sartorius semi-analytical scale. These components were consequently mixed manually in plastic bags and the resulting mixtures were fed by a gravimetric feeding system, K-SFS24 ex K-Tron, directly into the extruder's hopper.

Compounding was performed in a twin-screw co-rotating extruder ZE25 with a length over diameter (L/D) ratio of 32 ex Berstorff. The compounding conditions for the various plastics systems are summarized in Table 6.

There was an open vent at zone 7.

The extruded strands after cooling in water at room temperature, were pelletized in a pelletizer 750/3 ex Accrapak System Ltd. The pellets obtained were dried in a circulating air oven ex Heraeus Instruments at the following conditions:
For ABS: 75° C. for 4 hours.
For Poly(butylene terephthalate): 90° C. for 16 hours followed by an additional 4 hours at 120° C.
For Polycarbonate: 120° C. for 2 hours and an additional 1 hour at 90° C.

Test specimens were prepared by injection molding in an Allrounder 500-150 ex Arburg and the injection molding conditions are summarized in Table 6. All the molded specimens were conditioned before testing flammability according to the UL 94 standard (vertical condition) as follows:
For ABS: 60 hours at 70° C.
For Poly(butylene terephthalate): 168 hours at 70° C.
For Polycarbonate: 168 hours at 70° C.

TABLE 6

Processing conditions to prepare samples for testing flame retardancy

| | Type of plastic | | |
|---|---|---|---|
| | ABS | Poly(butylenes terephthlate) | Polycarbonate |
| Compounding conditions | | | |
| Temperature profile, °C. | RT*-160-230-230-230-230-230-230-230 | RT*-220-240-255-255-265-265-265-260 | RT*-200-220-230-230-230-230-230-240 |
| Temperature of the melt °C. | 230 | 265 | 250 |
| Screw rotation speed, rpm | 300 | 350 | 300 |
| Injection Molding conditions | | | |
| Temperature profile °C. | 180-200-230-230-230 | 230-240-260-270-280 | 230-250-250-250-255 |
| Mold temperature, °C. | 40 | 90 | 110 |
| Injection pressure, bar | 500 | 1800 | 2200 |
| Holding pressure, bar | 250 | 1800 | 2200 |
| Back pressure, bar | 20 | 45 | 20 |
| Injection time, sec. | 0.1 | 0.1 | 0.1 |
| Holding time, sec. | 10 | 10 | 10 |
| Cooling time, sec. | 5 | 10 | 8 |
| Mold closing force, kN | 500 | 500 | 500 |

TABLE 6-continued

Processing conditions to prepare samples for testing flame retardancy

| | Type of plastic | | |
|---|---|---|---|
| | ABS | Poly(butylenes terephthlate) | Polycarbonate |
| Filling volume, cm$^3$ | 21 | 21 | 21 |
| Injection speed, cm$^1$/sec | 10 | 112 | 90 |
| Mold reference number | S 22963 | S 22963 | S 22963 |

*RT—Room temperature (no heating in the feeding zone)

EXAMPLE 6

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of FR-245 and antimony trioxide. The compositions tested and their flame retardancy properties are summarized in Table 7.

TABLE 7

Application of the invention in ABS flame retarded by FR-245

| | Sample Number | | | |
|---|---|---|---|---|
| | 9 | 10 | 11 | 12 |
| PTFE concentrate type | No concentrate, reference | Example 2 sample no. 5 (6% PTFE 6-CN) | Blendex 449 | Blendex 499 |
| Composition, wt % | | | | |
| ABS Magnum 3404 + additives | 79.7 | 83.73 | 83.75 | 83.65 |
| FR-245 | 14.9 | 11.6 | 11.9 | 11.9 |
| Antimony trioxide masterbatch concentrate A.O. 112 | 5.4 | 4.25 | 4.3 | 4.3 |
| PTFE concentrate | 0.00 | 0.42 | 0.05 | 0.15 |
| Bromine content wt % (Calculated) | 10.0 | 8.0 | 8.0 | 8.0 |
| PTFE content wt % (Calculated) | 0.000 | 0.025 | 0.025 | 0.075 |
| Flame retardancy (UL 94V, 1.6 mm thickness) | | | | |
| Max. flaming time, sec. | 18 | 7 | 33 | 24 |
| Total flaming time, sec. | 85 | 35 | 155 | 103 |
| Max. afterglow, sec. | 31 | 25 | 0 | 77 |
| Total afterglow, sec. | 67 | 61 | 0 | 250 |
| Number of dripping samples | 3 | 0 | 5 | 0 |
| Number of cotton ignitions | 3 | 0 | 5 | 0 |
| Class | V-2 | V-0 | NR | NR |

It can be seen from the fire retardancy properties shown in Table 7 that the addition of a PTFE concentrate according to the invention is very efficient, as it enables a class V-0 not only with significantly less bromine and antimony trioxide, but also with shorter total flaming time and no dripping at all.

Compared with a commercial PTFE concentrate available on the market such as Blendex 449, the concentrate according to the invention is also much more efficient with respect to total flaming time, anti-dripping properties and flame retardancy class, being V-0 with a minimum content of PTFE in the final composition, while all the other examples with Blendex 449 are not rated even with three times more PTFE in the final composition.

EXAMPLE 7

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of FR-245 and antimony trioxide. The compositions tested and their flame retardancy properties are summarized in Table 8.

TABLE 8

Application of the invention in ABS flame retarded by FR-245

| | Sample Number | | |
|---|---|---|---|
| | 9 (Example 6) | 13 | 14 |
| PTFE concentrate type | No concentrate, reference | Example 2 sample no. 5 (6% PTFE 6-CN) | Blendex 449 |
| Composition, wt % | | | |
| ABS Magnum 3404 + additives | 79.7 | 79.6 | 79.65 |
| FR-245 | 14.9 | 14.6 | 14.9 |
| Antimony trioxide masterbatch concentrate A.O. 112 | 5.4 | 5.38 | 5.4 |
| PTFE concentrate | 0.00 | 0.42 | 0.05 |
| Bromine content wt % (Calculated) | 10.0 | 10.0 | 10.0 |
| PTFE content wt % (Calculated) | 0.000 | 0.025 | 0.025 |
| Flame retardancy (UL 94V, 1.6 mm thickness) | | | |
| Max. afterglow, sec. | 31 | 19 | 26 |
| Total afterglow, sec. | 67 | 45 | 76 |
| Class | V-2 | V-0 | V-0 |

In this example, one can see the advantages of the contribution of the use of the PTFE concentrate prepared according to the invention: For a similar bromine and antimony trioxide content, the molded samples containing it when tested according to UL 94 show much less afterglow time than commercial grades of PTFE concentrates.

EXAMPLE 8

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of FR-245 and antimony trioxide. The compositions tested and their flame retardancy properties are summarized in Table 9.

TABLE 9

Application of the invention in ABS flame retarded by FR-245

| | Sample Number | | | |
|---|---|---|---|---|
| | 9 (Example 6) | 13 (Example 7) | 15 | 16 |
| PTFE concentrate type | No concentrate, reference | Example 2 sample no. 5 (6% PTFE 6-CN) | Example 2 sample no. 5 (6% PTFE 6-CN) | Example 2 sample no. 5 (6% PTFE 6-CN) |
| Composition, wt % | | | | |
| ABS Magnum 3404 + additives | 79.7 | 79.6 | 79.47 | 79.35 |
| FR-245 | 14.9 | 14.6 | 14.3 | 14.0 |
| Antimony trioxide masterbatch concentrate A.O. 112 | 5.4 | 5.38 | 5.4 | 5.4 |
| PTFE concentrate | 0.00 | 0.42 | 0.83 | 1.25 |
| Bromine content wt % (Calculated) | 10.0 | 10.0 | 10.0 | 10.0 |
| PTFE content wt % (Calculated) | 0.000 | 0.025 | 0.050 | 0.075 |
| Flame retardancy (UL 94V, 1.6 mm thickness) | | | | |
| Total afterglow sec. | 67 | 45 | 31 | 18 |
| Class | V-2 | V-0 | V-0 | V-0 |

In this example, one can see that an increase of the loading of PTFE concentrate according to the invention in the composition brings additional improvement of the fire retardancy properties by further reducing the total afterglow time, while the bromine and antimony trioxide concentrate content are very similar in the formulation.

EXAMPLE 9

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of FR-245 and antimony trioxide. The compositions tested and their flame retardancy properties are summarized in Table 10.

TABLE 10

Application of the invention in ABS flame retarded by FR-245

| | Sample Number | |
|---|---|---|
| | 9 (Example 6) | 17 |
| PTFE concentrate type | No concentrate, reference | Example 2 sample no. 4 (12% Hostaflon 9202) |
| Composition wt % | | |
| ABS Magnum 3404 + additives | 79.7 | 79.79 |
| FR-245 | 14.9 | 14.4 |
| Antimony trioxide masterbatch concentrate A.O. 112 | 5.4 | 5.4 |
| PTFE concentrate | 0.00 | 0.41 |
| Bromine content wt % (Calculated) | 10.0 | 10.0 |
| PTFE content wt % (Calculated) | 0.000 | 0.050 |
| Flame retardancy (UL 94V, 1.6 mm thickness) | | |
| Max. flaming time, sec. | 18 | 7 |
| Total flaming time, sec. | 85 | 23 |
| Max. afterglow, sec. | 31 | 25 |
| Total afterglow, sec. | 67 | 50 |
| Number of dripping samples | 3 | 0 |
| Number of cotton ignitions | 3 | 0 |
| Class | V-2 | V-0 |

In this example it is shown that a PTFE concentrate prepared according to the invention as described in Example 2, sample 4, that contains 12% PTFE (grade Hostaflon 9202) is also contributing to improve significantly the fire retardancy properties of ABS compared with the reference composition that does not contain it. Not only this PTFE concentrate eliminates completely the dripping of the molded samples exposed to the flame (UL 94 standard), but moreover, significant reduction in burning and afterglow times is noticed.

EXAMPLE 10

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of FR-245 and antimony trioxide. The compositions tested and their flame retardancy properties are summarized in Table 11.

TABLE 11

Application of the invention in ABS flame retarded by FR-245

| Sample Number | 10 (Ex. 6) | 18 | 13 (Example 7) | 19 | 20 | 21 |
|---|---|---|---|---|---|---|
| PTFE concentrate type | Example 2 sample no. 5 (6% PTFE 6-CN) | | | PTFE 6-CN as is:, no use concentrate reference | | |
| Composition wt % | | | | | | |
| ABS Magnum 3404 + additives | 83.73 | 81.6 | 79.6 | 83.825 | 81.695 | 79.695 |
| FR-245 | 11.6 | 13.1 | 14.6 | 11.9 | 13.4 | 14.9 |
| Antimony trioxide masterbatch | 4.25 | 4.88 | 5.38 | 4.25 | 4.88 | 5.38 |

TABLE 11-continued

Application of the invention in ABS flame retarded by FR-245

| Sample Number | 10 (Ex. 6) | 18 | 13 (Example 7) | 19 | 20 | 21 |
|---|---|---|---|---|---|---|
| concentrate A.O. 112 | | | | | | |
| PTFE concentrate | 0.42 | 0.42 | 0.42 | 0.025 | 0.025 | 0.025 |
| Bromine content wt % (Calculated) | 8.0 | 9.0 | 10.0 | 8.0 | 9.0 | 10.0 |
| PTFE content wt % (Calculated) | 0.025 | 0.025 | 0.025 | 0.025 | 0.025 | 0.025 |
| Flame retardancy (UL 94 V, 1.6 mm thickness) | | | | | | |
| Max. flaming time, sec. | 7 | 3 | 3 | 19 | 13 | 3 |
| Total flaming time, sec. | 35 | 20 | 15 | 78 | 55 | 16 |
| Max. afterglow, sec. | 25 | 13 | 19 | 31 | 53 | 33 |
| Total afterglow, sec. | 61 | 35 | 45 | 37 | 88 | 40 |
| Number of dripping samples | 0 | 0 | 0 | 3 | 1 | 0 |
| Number of cotton ignitions | 0 | 0 | 0 | 3 | 1 | 0 |
| Class | V-0 | V-0 | V-0 | V-2 | V-2 | V-1 |

In this series of examples, a comparison is made between the use of a concentrate according to the invention that has been described in Example 2 as sample no. 5 (using 6% PTFE 6-CN) and the use of PTFE 6-CN and its introduction in the ABS compound as is and not as a concentrate. The results in Table 11 show a clear advantage achieved by the use of the concentrate according to the invention in terms of class of fire retardancy, class V-0 being achieved for all the formulations while with the use of PTFE as is they are classified V-2 or maximum V-1 with longer burning times and maximum afterglow times.

Moreover, PTFE concentrates as described in this invention have a suitable particle size and strength enabling a much easier feed in the hopper of the extruder during compounding without risking to lose some of the material on the wall of the hopper, as is the case when using PTFE powder. The PTFE concentrates as described in this invention are also easier to compound to get a homogeneous blend at the origin of better fire retardant efficiency.

EXAMPLE 11

Compositions of flame-retarded acrylonitrile-butadiene-styrene copolymers (ABS) were processed as described in Example 5 to prepare injection molded bars that were tested for their fire retardancy according to the UL 94 standard. The flame retardant system used is a combination of F-3020 and antimony trioxide. The compositions tested and their flame retardancy properties are summarized in Table 12.

In this series of examples, it is shown that PTFE concentrates prepared according to the invention are also efficient with other brominated flame-retardants such as tribromophenyl end-capped brominated epoxy oligomers (e.g. F-3020 produced by DSBG) to improve flame retardancy by reducing significantly flaming times and by eliminating dripping samples.

TABLE 12

Application of the invention in ABS flame retarded by F-3020

| | Sample Number | | |
|---|---|---|---|
| | 22 | 23 | 24 |
| PTFE concentrate type | No Concentrate, reference | Example 2 sample no. 5 (6% PTFE 6-CN) | Example 2 sample no. 4 (12% Hostaflon 9202) |
| Composition, wt % | | | |
| ABS Magnum 3404 + additives | 79.15 | 79.0 | 79.44 |
| F-3020 | 16.1 | 15.0 | 15.4 |
| Antimony trioxide masterbatch concentrate A.O. 112 | 4.75 | 4.75 | 4.75 |
| PTFE concentrate | 0.0 | 1.25 | 0.41 |
| Bromine content wt % (Calculated) | 9.0 | 9.0 | 9.0 |
| PTFE content wt % (Calculated) | 0.0 | 0.075 | 0.050 |
| Flame retardancy (UL 94V, 1.6 mm thickness) | | | |
| Max. flaming time, sec. | 10 | 7 | 3 |
| Total flaming time, sec. | 38 | 22 | 13 |
| Number of dripping samples | 2 | 0 | 0 |
| Number of cotton ignitions | 1 | 0 | 0 |
| Class | V-2 | V-0 | V-0 |

EXAMPLE 12

Compositions of non glass reinforced flame retarded poly (butylene terephthalate) (PBT) were processed as described in Example 5 to prepare injection molded bars that were tested for their fire retardancy according to the UL 94 standard. The flame retardant systems used are a combination of FR-1025 or F-2400 and antimony trioxide. The compositions tested and their flame retardancy properties are summarized in Table 13.

As can be seen from samples 25 and 26, the application of the invention in PBT fire-retarded by FR-1025 is very efficient to eliminate the dripping, reduce flaming times and reach class V-0 with the same loading of fire retardant. Fire retardant properties of samples 27 to 30 illustrate two advantages of the invention in the case of PBT fire retarded by F-2400:

1. Addition of the PTFE concentrate prepared according to the invention as in sample 28 eliminates the dripping seen in sample 27 of the molded samples and enables reaching class V-0 even with the thickness of 0.8 mm.
2. The efficiency of the PTFE concentrate prepared according to the invention cannot be achieved at all by the use of PTFE concentrate prepared with the same grade of PTFE by extrusion compounding followed by pelletization as in the existing practice in the plastic industry (samples 29 and 30). Even by doubling the PTFE content in the formulation, dripping is not eliminated and the molded PBT parts do not reach the more severe class V-0.

EXAMPLE 13

Compositions of polycarbonate (PC) were processed as described in Example 5 to prepare injection molded bars that were tested for their fire retardancy according to the UL 94 standard. The flame retardant system used is F-2400. The compositions tested and their flame retardancy properties are summarized in Table 14.

TABLE 14

Application of the invention in PC flame retarded by F-2400

| | Sample Number | |
|---|---|---|
| | 31 | 32 |
| PTFE concentrate type | Example 2 sample no. 6 (12% PTFE 6-CN) | Blendex 449 |

TABLE 13

Application of the invention in PBT flame retarded by FR-1025 or F-2400

| | Sample Number | | | | | |
|---|---|---|---|---|---|---|
| | 25 | 26 | 27 | 28 | 29 | 30 |
| PTFE concentrate type | No concentrate, reference | Example 4 Sample 8 | No concentrate, reference | Example 1 Sample 1 | 10% PTFE 6-CN masterbatch concentrate in F-2400 | 10% PTFE 6-CN masterbatch concentrate in F-2400 |
| Composition, wt % | | | | | | |
| PBT Celanex 2002-2 | 83.75 | 83.65 | 80.25 | 80.15 | 80.15 | 80.05 |
| FR-1025 | 10 | 9.1 | — | — | — | — |
| F-2400 | — | — | 13.5 | 11 | 12.6 | 11.7 |
| Antimony trioxide masterbatch concentrate A.O. M-112 | 6.25 | 6.25 | 6.25 | 6.25 | 6.25 | 6.25 |
| PTFE concentrate | 0 | 1 | 0 | 2.5 | 1 | 2 |
| Bromine content wt % (Calculated) | 7 | 7 | 7 | 7 | 7 | 7 |
| PTFE content wt % (Calculated) | 0 | 0.1 | 0 | 0.1 | 0.1 | 0.2 |
| Flame retardancy (UL 94V, 1.6 mm thickness) | | | | | | |
| Max. flaming time, sec. | 1 | 1 | 0 | 0 | 0 | 0 |
| Total flaming time, sec. | 10 | 5 | 0 | 0 | 0 | 0 |
| Number of dripping samples | 5 | 0 | 5 | 0 | 5 | 5 |
| Number of cotton ignitions | 4 | 0 | 5 | 0 | 5 | 5 |
| Class (thickness) | V-2 (1.6 mm) | V-0 (1.6 mm) | V-2 (0.8 mm) | V-0 (0.8 mm) | V-2 (0.8 mm) | V-2 (0.8 mm) |

TABLE 14-continued

Application of the invention in PC flame retarded by F-2400

| | Sample Number | |
|---|---|---|
| | 31 | 32 |
| Composition, wt % | | |
| PC Lexan 141 | 92.9 | 92.9 |
| F-2400 | 5.2 | 6.7 |
| PTFE concentrate | 1.7 | 0.2 |
| Bromine content wt % (Calculated) | 3.5 | 3.5 |
| PTFE content wt % (Calculated) | 0.1 | 0.1 |
| Flame retardancy (UL 94 V, 1.6 mm thickness) | | |
| Max. flaming time, sec. | 7 | 17 |
| Total flaming time, sec. | 28 | 72 |
| Number of dripping samples | 0 | 1 |
| Number of cotton ignitions | 0 | 1 |
| Class | V-0 | V-2 |
| Impact properties | | |
| Notched IZOD J/m | 806 | 785 |

It can be seen from the fire retardancy properties shown in Table 14 that the addition of a PTFE concentrate according to the invention is also more efficient in polycarbonate as it enables a class V-0 with a low-level of bromine and without any synergist such as antimony trioxide while with a commercial PTFE concentrate available on the market, such as Blendex 449, dripping is still occurring and only class V-2 is achieved. It is worthwhile to note also that better impact, an important property for polycarbonate applications, is obtained with the PTFE concentrate prepared according to the invention.

The above description and examples have been provided for the purpose of illustration and are not intended to limit the invention in any way. The novel compositions of the invention may be implemented with a variety of different plastic materials, and many modifications can be carried out in the compositions and in the processes for making them, all without exceeding the scope of the invention.

The invention claimed is:

1. A solid two layer antidripping fluoropolymer concentrate, in the form of a bulk block or particles, said concentrate consisting of:
   A) a first layer of fluoropolymer granules
   B) a second layer of a flame retardant selected from brominated epoxy resins melt-coated directly and homogeneously applied onto the first layer;
   C) said first layer of fluoropolymer granules with the second layer of melt-coated flame retardant directly on and homogeneously applied onto the first layer being obtained by
      i) melting the flame retardant; and optionally added at a different step additives selected from the group consisting of ultraviolet and light stabilizers, UV screeners, UV absorbers, release agents, lubricants, colorants, plasticizers, fillers, blowing agents, heat stabilizers, antioxidants, reinforcement additives, impact modifiers, and processing aids; into a homogeneous molten phase;
      ii) mixing fluoropolymer granules into said molten phase; and
      iii) solidifying said molten phase to form said two layer melt-coated fluoropolymer granules wherein the second layer of flame retardant coating directly contacts and is homogeneously applied onto the first layer of fluoropolymer granules.

2. The concentrate according to claim 1, wherein said concentrate further consists of one or more fluoropolymers and one or more flame retardants.

3. The concentrate according to claim 2, wherein said one or more fluoropolymers are selected from the group consisting of polytetrafluoroethylene (PTFE), poly(hexafluoroethylene), poly(tetrafluoroethylene-hexafluoroethylene), and poly(tetrafluoroethylene-ethylene-propylene).

4. The concentrate according to claim 2, wherein said one or more flame retardants are selected from the group consisting of brominated epoxy resins, high molecular weight brominated epoxy resins, modified brominated epoxy resins, low molecular weight brominated epoxy resins, partly endcapped brominated epoxy resins with fatty acid, and their mixtures.

5. Process for making the concentrate according to claim 2, which comprises melting a flame retardant, mixing the fluoropolymer with said molten flame retardant, allowing the mixture to solidify and particulating the solidified mixture.

6. Process for making the concentrate according to claim 2, which comprises providing flame retardant precursors in molten condition, mixing said precursors with a fluoropolymer and optionally with a catalyst, reacting said precursors to form a molten flame retardant mixed with said fluoropolymer, allowing the mixture to solidify and particulating the solidified mixture.

7. Process for making a thermoplastic composition having a thermoplastic polymer matrix and the concentrate according to claim 2, which comprise the steps of compounding the polymer matrix with the concentrate and optionally with other additives.

8. Process according to claim 7, wherein the polymer matrix and the concentrate, and optionally the other additives, are compounded in an apparatus selected from the group consisting of extruders, batch mixers and internal mixers.

9. The concentrate according to claim 1, containing an amount of the fluoropolymer from 0.1 wt % to 60 wt %.

10. The concentrate according to claim 9, containing an amount of the fluoropolymer from 0.5 wt % to 20 wt %.

11. The concentrate according to claim 1, wherein the flame retardant has a melting point below 300° C.

12. The concentrate according to claim 1, wherein the flame retardant is obtained from precursors having a melting point below 300° C.

13. The concentrate according to claim 1, wherein the flame retardant has a melt viscosity lower than 10,000 cp.

14. The concentrate according to claim 13, wherein the flame retardants or said flame retardant precursors has a melt viscosity lower than 2,000 cp.

15. Process for making a thermoplastic composition having a thermoplastic polymer matrix and the concentrate according to claim 1, which comprise the steps of compounding the polymer matrix with the concentrate and optionally with other additives.

16. Process according to claim 15, wherein the polymer matrix and the concentrate, and optionally the other additives, are compounded in an apparatus selected from the group consisting of extruders, batch mixers and internal mixers.

17. The concentrate according to claim 1, wherein the flame retardant is obtained by reacting flame retardant precursors in the presence of a catalyst.

* * * * *